No. 883,384. PATENTED MAR. 31, 1908.
I. M. BREMER.
DOG COLLAR.
APPLICATION FILED OCT. 25, 1907.
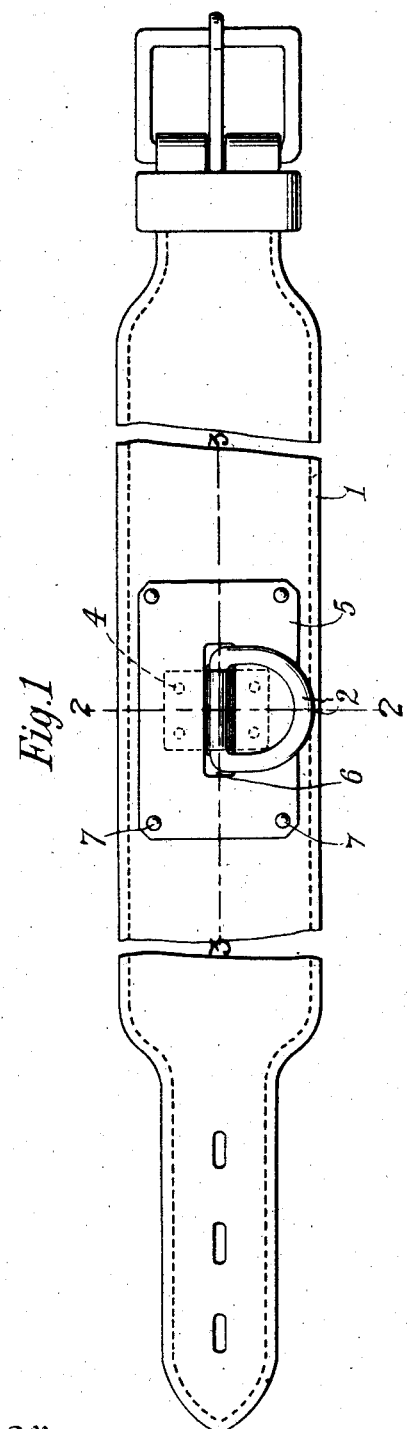
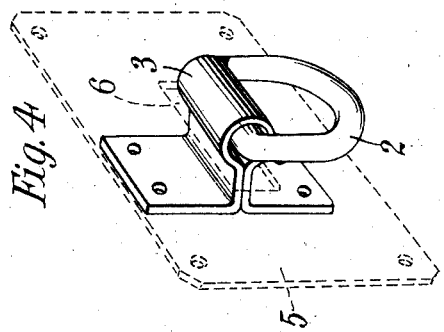
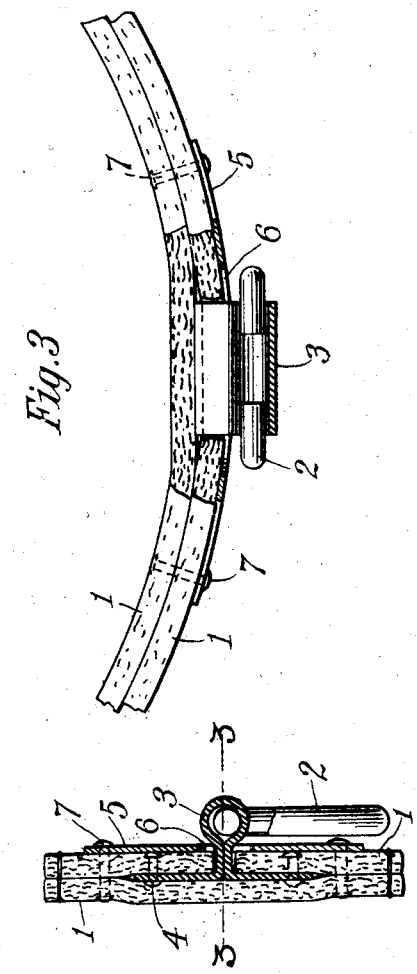
Witnesses:
Isidor Medford Bremer, Inventor
By his Attorney

UNITED STATES PATENT OFFICE.

ISIDOR MEDFORD BREMER, OF NEW YORK, N. Y.

DOG-COLLAR.

No. 883,384.

Specification of Letters Patent.

Patented March 31, 1908.

Application filed October 25, 1907. Serial No. 399,099.

*To all whom it may concern:*

Be it known that I, ISIDOR MEDFORD BREMER, a citizen of the United States, and a resident of the borough of Manhattan, city and State of New York, have invented certain new and useful Improvements in Dog-Collars, of which the following is a specification.

My present invention is an improvement in dog collars and the like, relating to means on said collars for attaching the leash, and has the following advantages among others:— First, the attaching means on the collar for the leash is through the name-plate so that the name-plate and ornamental portion of the collar is uppermost and in full view when the animal is under leash. Second: the construction is such as to anchor or secure the leash attaching means with great strength to the collar. Third: in addition to the above the combination of devices making up my invention has a general effectiveness both as to appearance, readiness of manufacture and various other features of utility.

In the drawings which show one of the forms which my improvements may take, Figure 1 is a top plan view of a collar embodying my improvements with portions on either side intermediate the ends of the collar and its middle broken away; Fig. 2 is a sectional view partly in elevation on the line 2—2 in Fig. 1 seen in the direction of the arrow; Fig. 3 is a horizontal section partly in elevation on the line 3—3 in Fig. 1 seen in the direction of the arrow; and Fig. 4 is a perspective view of certain parts detached.

I will now describe my improvements with special reference to the devices of the accompanying drawings, reserving it to the claims to point out the novel features.

The collar shown is made of two strips 1—1 of leather or other suitable material stitched together at their edges.

2 is a ring which being intended primarily for leash-attaching purposes may be conveniently designated a leash-ring, and is shown secured to the collar through the intervention of an intermediate member 3 consisting of a strip of material formed into the shape preferably as shown in Fig. 4, wherein its middle portion is looped about the ring to form a surrounding sleeve upon which the ring may swivel or pivot. Ordinarily this member 3 will be made of a strip of metal, although other materials could be substituted. Said member 3 has a foot or base portion which in the collar shown is located between the two layers of the collar and riveted at 4 to the top layer. By this means the member 3 is secured to the collar with its sleeve or eye-portion projecting through the top or outer layer of the collar, which for this purpose is perforated with a suitable opening.

It will be noted that the described members are located at the name-plate portion of the collar and in fact project through the name-plate 5, which is provided with an opening 6 for this purpose. Rivets 7 secure the name-plate through both layers of the collar.

The sleeve portion of the member 3 projects sufficiently far beyond the name plate to permit the leash-ring to lie flat against it.

The aforesaid devices having been assembled on the collar and attached, the stitching may then be completed about the edges of the collar to hold its two layers together.

It will be noted that the strain of the leash on the ring 2 cannot act to pull off the name-plate, because the intermediate member 3 is not dependent for its support upon the name-plate, but on the contrary has its attachment in or on the material of the collar itself. In fact when the foot portion of the intermediate member is located as shown in the preferred form between the layers of the collar, it is hardly necessary to use the rivets 4 except as preventing said member from slipping and twisting about unnecessarily on the collar within the confines of its opening.

Although the name-plate does not act as a direct or main support or attachment for the leash attaching member or means, nevertheless being of metal or equivalent stiff construction it assists in giving greater security of attachment to said member or means on the collar by greatly stiffening the collar at this point and by preventing the layers of the collar from separating under pulling strain of the leash. Moreover, the name-plate being the ornamental portion of the collar and the leash attaching means projecting through it, it is obvious that the best portion of the collar will be uppermost when the animal is led.

Having thus described my invention, what I claim is:

1. In a collar comprising two strips of material secured together, a metal plate on the outside of the collar secured through both layers, said plate having an opening, a leash-ring carrying member which projects through said opening in the plate and through the layer of collar next to the plate, and said member having a foot located between the layers of the collar and riveted to the layer next the plate.

2. In a collar comprising two layers of material, a metal name-plate on said collar said name-plate having an opening, and leash attaching means comprising a member which projects through the opening in the name plate and has a base portion anchored between the two layers of the collar.

3. In a collar, the combination of a metal plate on said collar said plate having an opening, and leash attaching means projecting through the opening in said plate and secured directly to the collar.

4. In a collar comprising two layers of material the outer layer having an opening, a metal name-plate on said collar having an opening therein corresponding with the opening through the upper layer of the collar, a strip located between the layers of the collar and elevated at its middle to pass through the aforesaid openings and formed into a projecting sleeve, and a leash-ring mounted in said sleeve.

5. In a collar having an opening therethrough, a metal name-plate on said collar having an opening therein corresponding to the opening through the collar, a strip of material elevated at its middle to pass through the aforesaid openings and formed into a projecting sleeve, the axis of which extends lengthwise of the collar, and a leash-ring mounted in said sleeve.

In witness whereof, I have signed my name to the foregoing specification in the presence of two subscribing witnesses.

ISIDOR MEDFORD BREMER.

Witnesses:
H. R. BAUER,
T. W. SPRINGMEYER.